United States Patent
Sorriero et al.

(10) Patent No.: US 6,294,301 B1
(45) Date of Patent: Sep. 25, 2001

(54) POLYMER AND PHOTOCONDUCTIVE ELEMENT HAVING A POLYMERIC BARRIER LAYER

(75) Inventors: Louis J. Sorriero, Rochester, NY (US); Marie B. O'Regan, Santa Barbara, CA (US); Michel F. Molaire, Rochester, NY (US)

(73) Assignee: Nexpress Solutions LLC, Rochester, NY (US)

( * ) Notice: Subject to any disclaimer, the term of this patent is extended or adjusted under 35 U.S.C. 154(b) by 0 days.

(21) Appl. No.: 09/574,775

(22) Filed: May 19, 2000

(51) Int. Cl.[7] ....................................... G03G 5/10
(52) U.S. Cl. ................................. 430/64; 430/96
(58) Field of Search ................... 430/66, 67, 96, 430/64

(56) References Cited

U.S. PATENT DOCUMENTS

| | | | |
|---|---|---|---|
| 3,856,752 | * 12/1974 | Bateman et al. | 260/65 |
| 4,442,193 | * 4/1984 | Chen et al. | 430/83 |
| 4,618,560 | * 10/1986 | Borsenberger et al. | 430/130 |
| 4,668,600 | * 5/1987 | Lingnau | 430/83 |
| 4,687,834 | * 8/1987 | Bartmann et al. | 528/291 |
| 4,830,953 | * 5/1989 | Bateman | 430/197 |
| 4,971,873 | * 11/1990 | Pavlisko et al. | 430/58 |
| 4,992,349 | * 2/1991 | Chen et al. | 430/58 |
| 5,128,226 | * 7/1992 | Hung | 430/58 |
| 5,266,429 | * 11/1993 | Sorriero et al. | 430/58 |
| 5,614,342 | * 3/1997 | Molaire et al. | 430/78 |
| 5,641,599 | * 6/1997 | Markovics et al. | 430/59 |
| 5,681,677 | * 10/1997 | Bugner et al. | 430/58 |
| 5,733,695 | * 3/1998 | Molaire et al. | 430/58 |
| 5,786,119 | * 7/1998 | Sorriero et al. | 430/96 |

* cited by examiner

*Primary Examiner*—John Goodrow
(74) *Attorney, Agent, or Firm*—Lawrence P. Kessler

(57) ABSTRACT

In a photoconductive element comprising a conductive support, e.g., an electrically conductive film, drum or belt on which a negatively chargeable photoconductive layer is formed, an electrical barrier layer is formed between the support and the photoconductive layer. The barrier layer provides a high energy barrier to the injection of positive charges but transports electrons under an applied electric field. The barrier layer of the invention transports charge by electronic rather than ionic mechanisms and, therefore, is not substantially affected by humidity changes. The barrier layer comprises a polyester-co-imide, polyesterionomer-co-imide or polyamide-co-imide having covalently bonded as repeating units in the polymer chain, aromatic tetracarboxylbisimide groups of the formula:

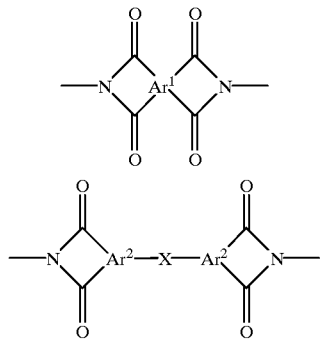

Figure 1:
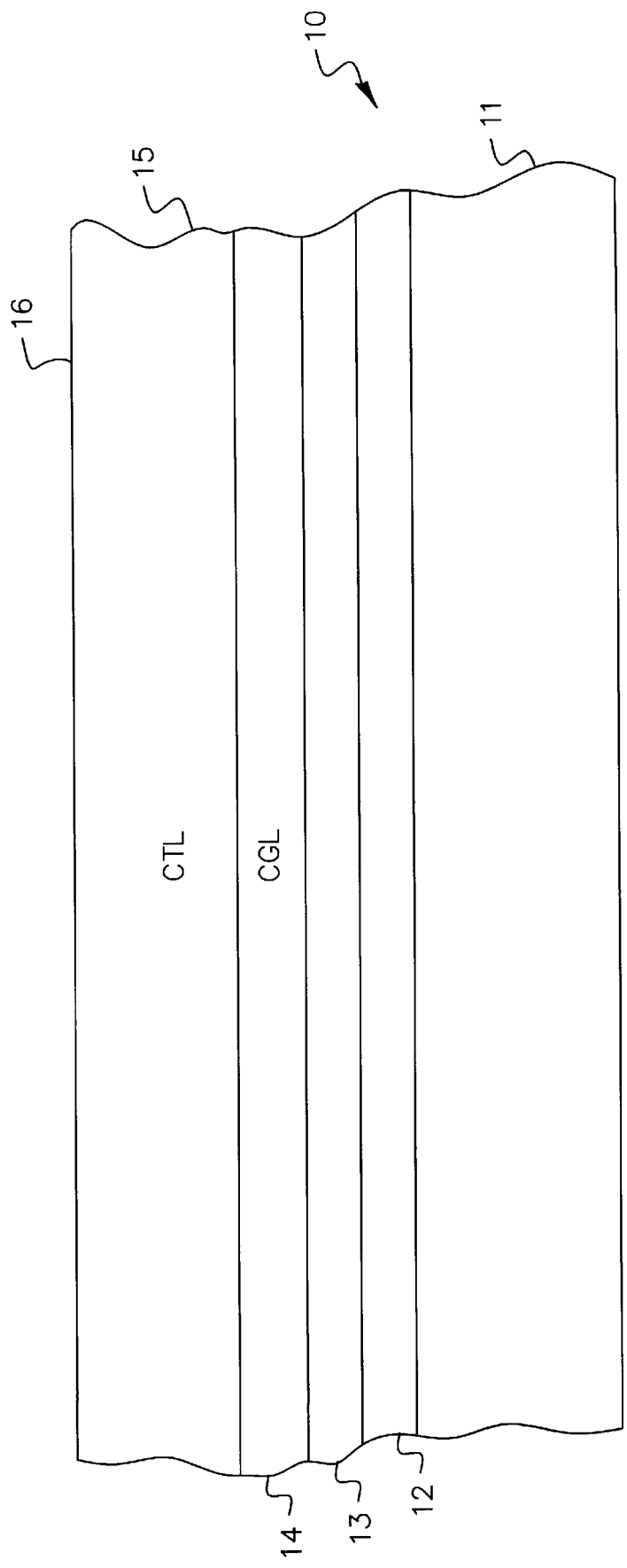

wherein $Ar^1$ and $Ar^2$ represent, respectively, tetravalent and trivalent aromatic groups of 6 to 20 carbon atoms.

32 Claims, 5 Drawing Sheets

POLYMER AND PHOTOCONDUCTIVE ELEMENT HAVING A POLYMERIC BARRIER LAYER

FIELD OF THE INVENTION

This invention relates to electrophotography. More particularly, it relates to novel polymers and a novel photoconductive element that contains a polymeric electrical charge barrier layer.

BACKGROUND OF THE INVENTION

Photoconductive elements useful, for example, in electrophotographic copiers and printers are composed of a conducting support having a photoconductive layer that is insulating in the dark but becomes conductive upon exposure to actinic radiation. To form images, the surface of the element is electrostatically and uniformly charged in the dark and then exposed to a pattern of actinic radiation. In areas where the photoconductive layer is irradiated, mobile charge carriers are generated which migrate to the surface and dissipate the surface charge. This leaves in nonirradiated areas a charge pattern known as a latent electrostatic image. The latent image can be developed, either on the surface on which it is formed or on another surface to which it is transferred, by application of a liquid or dry developer containing finely divided charged toner particles.

Photoconductive elements can comprise single or multiple active layers. Those with multiple active layers (also called multi-active elements) have at least one charge-generation layer and at least one n-type or p-type charge-transport layer. Under actinic radiation, the charge-generation layer generates mobile charge carriers and the charge-transport layer facilitates migration of the charge carriers to the surface of the element, where they dissipate the uniform electrostatic charge and form the latent electrostatic image.

Also useful in photoconductive elements are charge barrier layers, which are formed between the conductive layer and the charge generation layer to restrict undesired injection of charge carriers from the conductive layer. Various polymers are known for use in barrier layers of photoconductive elements. For example, the patent to Hung, U.S. Pat. No. 5,128,226, discloses a photoconductor element having an n-type charge transport layer and a barrier layer, the latter comprising a particular vinyl copolymer. Steklenski, et al., U.S. Pat. No. 4,082,551, refers to Trevoy, U.S. Pat. No. 3,428,451, as disclosing a two-layer system that includes cellulose nitrate as an electrical barrier. Bugner et al., U.S. Pat. No. 5,681,677, discloses photoconductive elements having a barrier layer comprising certain polyester ionomers. Pavlisko et al, U.S. Pat. No. 4,971,873, discloses solvent-soluble polyimides as polymeric binders for photoconductor element layers, including charge transport layers and barrier layers.

The known barrier layer materials have certain drawbacks, especially when used with negatively charged elements having p-type charge transport layers. Thus, a negative surface charge on the photoconductive element requires the barrier material to provide a high-energy barrier to the injection of positive charges (also known as holes) and to transport electrons under an applied electric field. Many known barrier layer materials are not sufficiently resistant to the injection of positive charges from the conductive support of the photoconductive element. Also, for many known barrier materials the mechanism of charge transport is ionic. The ambient humidity affects the water content of the barrier material and, hence, its ionic charge transport mechanism. A need exists for charge barrier materials that transport charge by electronic rather than ionic mechanisms and that, therefore, are not substantially affected by humidity changes.

Still further, a number of known barrier layer materials function satisfactorily only when coated in thin layers. As a consequence, any irregularities in the coating surface, such as bumps or skips, can alter the electric field across the surface. This in turn can cause irregularities in the quality of images produced with the photoconductive element.

Accordingly, a need exists for a negatively chargeable photoconductive element having a p-type photoconductor, and including an electrical barrier layer that can be coated from an aqueous or an organic medium, that has good resistance to the injection of positive charges, that can be sufficiently thick that minor surface irregularities do not substantially alter the field strength and that resists hole transport over a wide humidity range. Still further a need exists for photoconductive elements of which the barrier layer is substantially impervious to or insoluble in solvents used for coating other layers, e.g., charge generation layers, over the barrier layer. In accordance with the present invention, a novel photoconductive element and certain novel polyamides that meet such needs are provided.

Photoconductive elements comprising a photoconductive layer formed on a conductive support such as a film, belt or drum, with or without other layers such as a barrier layer, are also referred to herein, for brevity, as photoconductors.

BRIEF SUMMARY OF THE INVENTION

The photoconductive element of the invention comprises an electrically conductive support an electrical barrier layer and, solvent-coated over the barrier layer, a charge generation layer that is capable of generating positive charge carriers when exposed to actinic radiation. The electrical barrier layer, which restrains the injection of positive charge carriers from the conductive support, comprises a condensation polymer having as a repeating unit a planar, electron-deficient, aromatic tetracarbonylbisimide group that transports charge primarily by electronic rather than ionic transport mechanisms. This barrier layer polymer is sub-stantial insoluble in the solvent for the charge generation layer under the coating conditions employed. More specifically, in the photoconductive element of the invention, said barrier layer comprises a condensation polymer having covalently bonded as repeating units in the polymer chain aromatic tetracarbonylbisimide groups of the formula:

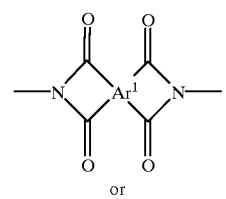

or

-continued

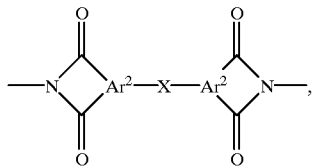

wherein Ar² and Ar² represent, respectively, tetravalent and trivalent aromatic groups of 6 to 20 carbon atoms.

Preferably, the barrier layer polymer in the photoconductive element of the invention is a polyester-co-imide, polyesterionomer-co-imide, or polyamide-co-imide that contains an aromatic tetracarbonylbisimide group, and has the formula:

I

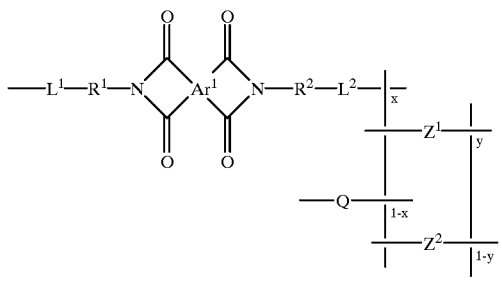

wherin Q represents one or more groups selected from
(a) alkylenedioxy, aromatic dicarboxy and aromatic diamino groups having 2 to 36 carbon atoms;

(b)

(c)

and (d)

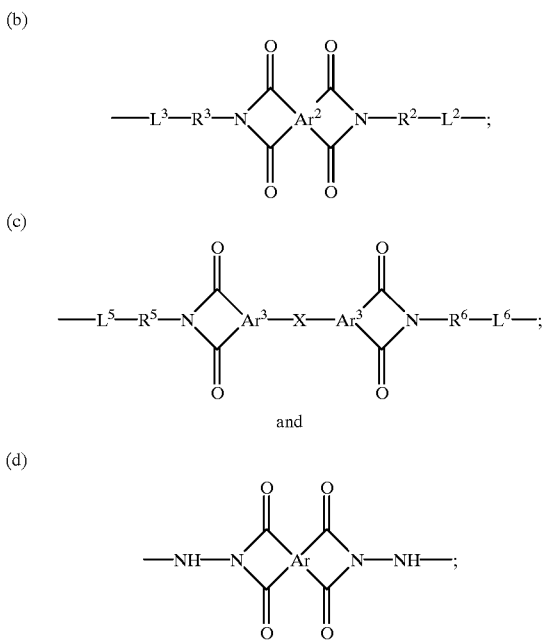

and wherein Ar, Ar¹ and Ar² independently represent tetravalent aromatic groups having 6 to 20 carbon atoms; Ar³ represents a trivalent aromatic group having 6 to 12 carbon atoms; $R^1$ and $R^2$ independently represent alkylene or alkyleneoxy groups having 2 to 12 carbon atoms; $L^1, L^2, L^3, L^4, L^5$ and $L^6$ independently represent O, CO, CO$_2$, or NH; and $Z^1$ and $Z^2$ independently represent an alkylenedioxy or alkylenediamino group having 2 to 36 carbon atoms; X is O, C(CF$_3$)$_2$, S=O or SO$_2$; and x and y represent mole fractions, x being the mole fraction of the group that contains Ar¹ and y being the mole fraction of the group, $Z^1$; and wherein x is 0.05 to 1 and y is 0 to 0.95.

The present invention also includes as novel compositions of matter the novel polyamides defined above.

THE DRAWINGS

The invention will be described in more detail by reference to the drawings, of which FIG. 1 is a schematic cross section, not to scale, of one embodiment of a photoconductive element of the invention; and FIGS. 2–5 are graphical plots of results obtained in testing examples of the invention and comparative examples.

DETAILED DESCRIPTION OF THE INVENTION

As illustrated in FIG. 1, a photoconductive element of the invention 10 comprises a polymeric film support 11. On this support is coated an electrically conductive layer 12. Over the conductive layer is coated a polymeric barrier layer 13 the composition of which is indicated above and described more fully hereinafter. Over the barrier layer is coated a charge generation layer 14, and over the latter is coated a p-type charge transport layer 15, which is capable of transporting positive charge carriers generated by layer 14 to dissipate negative charges on the surface 16 of the photoconductive element 10.

The barrier and other layers of the photoconductive element are coated on an "electrically-conductive support," by which is meant either a support material that is electrically-conductive itself or a support material comprising a non-conductive substrate, such as support 11 of the drawing, on which is coated a conductive layer 12, such as vacuum deposited or electroplated nickel. The support can be fabricated in any suitable configuration, for example, as a sheet, a drum, or an endless belt. Examples of "electrically-conductive supports" are described in Bugner et al, U.S. Pat. No. 5,681,677 which is incorporated herein by reference.

The barrier layer composition can be applied by coating an aqueous dispersion of the polymer on the electrically conductive support using, for example, a technique such as knife coating, spray coating, swirl coating, extrusion hopper coating, or the like. After application to the conductive support, the coating can be air dried. It should be understood, however, that, if desired, the barrier layer polymers can be coated as solutions or dispersions in organic solvents.

Typical solvents for solvent coating a photoconductive layer charge generation layer over a charge barrier layer are disclosed, for example, in Bugner et al., U.S. Pat. No. 5,681,677; Molaire et al, U.S. Pat. No. 5,733,695; and Molaire et al, U.S. Pat. No. 5,614,342, all of which patents are incorporated herein by reference. As these references indicate the photoconductive material, e.g., a photoconductive pigment, is solvent coated by dispersing it in a binder polymer solution. Commonly used solvents for this purpose include chlorinated hydrocarbons such as dichloromethane as well as ketones and tetrahydrofuran. A problem with known barrier layer compositions is that such solvents for the coating of the photoconductive or charge generation layer will also dissolve or damage the barrier layer. An advantage of the barrier layer compositions of the invention, especially those comprising a polyesterionomer-co-imide or a polyamide-co-imide, is that they are not substantially dissolved or damaged by chlorinated hydrocarbons or the other commonly used solvents for photoconductor or charge generation layers, at the temperatures and for the time periods employed for coating such layers.

Certain of the barrier layer polymers of the invention can be dissolved in mixtures of dichloromethane with a polar solvent such as methanol or ethanol, as will be seen from working examples hereinafter. However, the barrier layer polymers of the invention, especially the polyester-ionomer-co-imide and polyamide-co-imide species, do not dissolve substantially in chlorinated hydrocarbons, e.g., dichloromethane or in ketones such as dialkylketones or in tetrahydroftiran. By "substantially insoluble" is meant dissolving to the extent of less than 0.1 mg/100 ml of solvent at 25° C. over a period of 5 minutes.

Another advantage of the polymers employed in barrier layers in accordance with the invention is that in addition to their other advantages they can be made from more readily available starting materials than can the polyimides of Pavlisko et al U.S. Pat. No. 4,971,873 and that the starting materials can be selected to yield a polymer that is either substantially insoluble or soluble in particular solvents.

The preferred embodiments of the present invention comprise multi-active photoconductive elements having separate charge generation layers and charge transport layers; such elements provide superior photographic speed and benefit the most from the use of a barrier layer to restrain migration of positive charge carriers from the conductive support. However, it should be understood that the invention also includes single layer photoconductive elements having a barrier layer between the conductive support and the photoconductive layer. Even with such single layer elements, the injection of positive charges from the conductive support is a problem. Hence, the inclusion of a barrier layer in accordance with the invention provides a valuable improvement in such elements.

The compositions of, the locations and methods of forming the photoconductive charge generating layer, the charge transport layer and other components of the photoconductive element of the invention can be as described in Bugner et al., U.S. Pat. No. 5,681,677 cited above and incorporated herein by reference.

A preferred conductive support for use in electrophotographic copying machines and in laser copiers is a seamless, flexible cylinder or belt of nickel which can be electroplated or vacuum deposited on a polymeric cylinder or belt. Such nickel conductive supports have important advantages but at least one drawback for which the barrier layer compositions of the invention provide a solution. The deposited nickel layers often have bumps or other irregularities which, when the barrier layer is thin, can cause an irregular field strength across the surface and thus cause defects in the resulting image. As an advantage over conventional barrier materials, the barrier materials of the present invention can be formed as thick layers and still have the desired properties. As a relatively thick layer, e.g., greater than 0.5 micron and preferably greater than one micron, the barrier layer of the invention can compensate for irregularity in the thickness of the nickel surface. Other useful supports include belts or cylinders of stainless steel or copper.

The barrier layer polymer in the photoconductive element of the invention, is a condensation polymer that contains as a repeating unit a planar, electron-deficient aromatic tetra-carbonylbisimide group as defined above. More specifically, the preferred barrier layer polymer comprises a polyester-co-imide, polyesterionomer-co-imide, or polyamide-co-imide of formula I above.

The barrier layer polymers in accordance with the invention thus contain planar, electron-deficient aromatic, functionalized bisimide groups in which the aromatic group is a tri-or tetravalent benzene, perylene, naphthalene or anthraquinone nucleus. In addition to the carbonyl groups, Ar, $Ar^1$, $Ar^2$ and $Ar^3$ of formula I can have other substituents such as alkyl, alkoxy, halo and the like.

Useful imides include 1,2,4,5-benzenetetracarboxylic-bisimides:

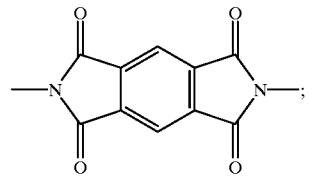

1,4,5,8-naphthalenetetracarboxylic-bisimides:

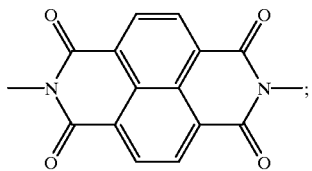

3,4,9,10-perylenetetracarboxylic-bisimides:

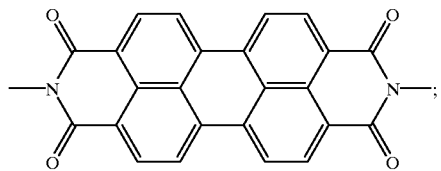

2,3,6,7-anthraquinonetetracarboxylic-bisimides:

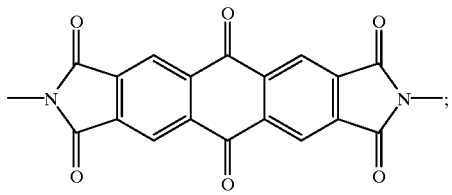

and hexafluoroisopropylidene-2,2',3,3'-benzenetetracarboxylic-bisimides:

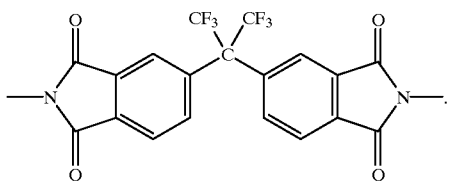

Especially preferred are naphthalenetetracarbonyl-bisimides and perylenetetracarbonyl-bisimides. They transport electrons more effectively than corresponding groups in formula I wherein $Ar^1$ is a single ring. These moieties are especially useful when incorporated into polyesters-co-imides, polyesterionomer-co-imides, and polyamide-co-imides as the sole electron-deficient moiety or when incorporated into such polymers in various combinations. The mole percent concentration of the electron deficient moiety in the polymer can range from 2.5% to 100%, the preferred range being 2.5% to 75%.

Examples of specific dicarbonyl groups, alkylenedioxy groups and alkylene groups that are suitable in the barrier layer polymers for photoconductive elements of the invention are cited in Sorriero et al, U.S. Pat. No. 5,266,429, incorporated herein by reference.

The barrier layer polymers in accordance with the invention are prepared by condensation of at least one diol or diamine compound with at least one dicarboxylic acid, ester, anhydride, chloride or mixtures thereof. Such polymers have a weight-average molecular weight of 2,500 to 250,000, preferably 5,000 to 150,000.

The bisimide structure containing the tetravalent-aromatic nucleus can be incorporated either as a diol or diacid by reaction of the corresponding tetracarbonyl dianhydride with the appropriate amino-alcohol or amino-acid. The resulting bisimide-diols or bisimide-diacids may then be polymerized, condensed with diacids, diol, or diamines to prepare the barrier layer polymers by techniques well-known in the art. The preferred technique is melt phase polycondensation as described by Sorensen and Campbell, "Preparative Methods of Polymer Chemistry," pp. 113–116 and 62–64, Interscience Publishing, Inc. (1961) New York, N.Y.

Preferred diesters, diacids and dianhydrides for preparing the barrier layer polymers include terephthalic acid, isophthalic acid, maleic acid, 2,6-naphthanoic acid, 5-t-butylisophthalic acid, 1,4-cyclohexanedicarboxylic acid, 1,1,3-trimethyl-3-(4-carboxyphenyl)-5-indancarboxylic acid, pyromellitic dianhydride, maleic anhydride, dimethyl succinate, dimethyl glutarate, dimethyl azelate, dimethyl adipate, dimethyl sebacate, dodecanedioic acid, and 1-methylsuccinic acid.

Preferred diols and their equivalents for preparing the barrier layer polymers include ethylene glycol, ethylene carbonate, 1,2-propanediol, 1-methyl-ethylene carbonate, 2,2'-oxydiethanol, 1,4-butanediol, 1,6-hexanediol, 1,10-decanediol, 1,4-cyclohexanedimethanol, 2,2-dimethyl-1,3-propanediol, $4,4'$-isopropylidenebisphenoxyethanol and tetraethylene glycol.

The described polymers are all good film formers and exhibit excellent adhesion to most of the substrates of interest. These polymers resist attack by the solvent employed for the next film layer, in this case the solvent for the charge-generation-layer (CGL). Resistance to CGL solvent renders the barrier layer intact and results in controlled thickness as well as reproducible film electrical properties.

The following examples further illustrate the invention:

POLYESTER-CO-IMIDE EXAMPLES

The polyester-co-imide examples were all prepared by known melt phase polycondensation techniques as documented by Sorenson et al, cited above, pp. 113–116.

Polymer A: Poly [1,4,5,8-naphthalenetetracarbonyl-bisimido-2-ethoxyethylene-co-2,2-dimethyl-1,3-propylene (50/50) isophthalate].

A mixture of 194 g (1.00 mole) of dimethylisophthalate, 72.8 g (0.70 mole) of 2,2-dimethyl-1,3-propanediol, and 221 g (0.50 mole) of 1,4,5,8-naphthalenetetracarbonyl-bis(2-hydroxyethoxyethyl)imide contained in a polymerization flask equipped with a Claisen head and a nitrogen inlet tube was heated to 200° C. under a nitrogen atmosphere to produce a burgundy, transparent, homogeneous melt. Then 100 ppm of titanium isopropoxide catalyst were added, and the temperature was slowly raised to 280° C. over several hours. Heating was continued until no further evolution of methanol could be detected. A mechanical stirrer was introduced, and the flask was connected to a source of vacuum. The mixture was stirred under vacuum at 280° C. for about two hours, then cooled to room temperature. The polymerization product was removed from the reaction vessel and submitted for assay. Polymer A has an inherent viscosity in dichloromethane of 0.65 dl/g, a glass transition temperature of 74° C., and a weight average molecular weight of 64,000.

Polymer B: Poly [1,4,5,8-naphthalenetetracarbonyl-bisimido-5-pentamethylene-co-2,2-dimethyl-1,3-propylene-co-ethylene (25/25/50) terephthalate].

A mixture of 194 g (1.00 mole) of dimethylterephthalate, 109.5 g (0.25 mole) of 1,4,5,8-naphthalenetetracarbonyl-bis (5-hydroxypentyl)imide, 36.4 g (0.35 mole) of 2,2-dimethyl-1,3-propanediol, and 21.7 g (0.35 mole) of ethylene glycol was combined in a polymerization flask as per polymer A. The resulting polymer B had an inherent viscosity of 0.62 dl/g, a glass transition temperature of 93° C., and a weight average molecular weight of 72,000.

Polymer C: Poly [1,4,5,8-naphthalenetetracarbonyl-bisimido-5-pentamethylene-co-ethylene (50/50) terephthalate].

A mixture of 194 g (1.00 mole) of dimethylterephthalate, 219 g (0.50 mole) of 1,4,5,8-naphthalenetetracarbonyl-bis (5-hydroxypentyl)imide and 43.4 g (0.70 mole) of ethylene glycol were combined in a polymerization flask as per polymer A. The resulting polymer C had an inherent viscosity of 0.54 dl/g, a glass transition temperature of 92° C., and a weight average molecular weight of 56,000.

The polyester-co-imide examples described above are listed in Table I along with their respective responses to varying relative humidity (RH). The responses are shown as weight percent water loss, which changes the ionic conductivity of the polymer.

TABLE I

POLYESTER-CO-IMIDES

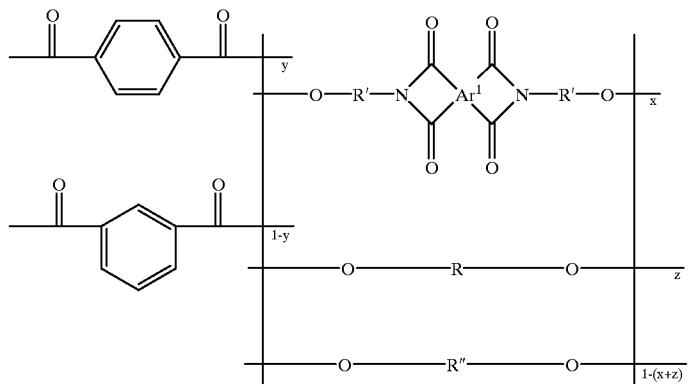

| Polymer | x | y | z | R" | R' | R | % Water Loss From 70 F./60% RH To 80 F./20% RH |
|---|---|---|---|---|---|---|---|
| A | 0.5 | 0 | 0.5 | $-\!\!-\!(CH_2)_2\!-\!O\!-\!(CH_2)_2\!-\!\!-$ | | $-H_2C-C(CH_3)_2-CH_2-$ | 0.038 |
| B | 0.25 | 1.00 | 0.25 | $-\!(CH_2)_2\!-$ | $-\!(CH_2)_5\!-$ | $-H_2C-C(CH_3)_2-CH_2-$ | 0.087 |
| C | 0.50 | 1.00 | 0.50 | $-\!(CH_2)_2\!-$ | $-\!(CH_2)_5\!-$ | | 0.225 |

POLYESTERIONOMER-CO-IMIDE EXAMPLES

The polyesterionomer-co-imide examples were also prepared by known melt phase polycondensation techniques as documented by Sorensen et al, cited above, pp. 113–116.

The polyesterionomer-co-imides of the examples hereinafter all contain the 5-sodiosulfoisophthalic acid moiety but the present invention is not limited to the use of this ionic moiety. The inventors have found, for example, that ionic esters such as dimethyl-3,3'-iminobis-sodiosulfonylbenzoate, dimethyl-5-(N-potassio-p-toluenesulfonylamido) sulfonyl-isophthalate, and dimethyl-5-(4-sodiosulfonyl)isophthlate are also useful for forming the polyester-ionomers. Cations including alkali metal, ammonium, and phosphonium cations have been shown to exhibit the desired properties.

Comparative Polymer D: Poly [2,2'-oxydiethylene-co-ethylene (78/22) 5-sodiosulfoisophthalate-co-isophthalate (12/88)] is commercially available as AQ38S polymer from Eastman Chemical Company, Kingsport, TN. This material was tested as received and was also prepared as follows:

A mixture of 170.2 g (0.88 mole) of dimethylisophthalate, 35.5 g (0.12 moles) of dimethyl-5-sodiosulfoisophthalate, 19.1 g (0.031 mole) ethylene glycol and 86.2 g (0.78 mole) of 2,2'-oxydiethanol contained in a polymerization flask equipped with a Claisen head and a nitrogen inlet tube was heated to 200° C. under a nitrogen atmosphere to produce a clear, homogenous melt. Then 100ppm of titanium isopropoxide catalyst were added, and the temperature slowly raised to 260° C. over several hours. Heating was continued until no further evolution of methanol could be detected. A mechanical stirrer was then introduced, and the flask connected to a source of vacuum. The mixture was stirred under vacuum at 260° C. for about two hours, then cooled to room temperature. The resulting Comparative Polymer D had an inherent viscosity of 0.68 dl/g, a glass transition temperature of 40° C., and a weight average molecular weight of 58,000.

Polymer E-1: Poly [2,2'-oxydiethylene-co-1,4,5,8-naphthalenetetracarbonyl-bisimido-5-pentamethylene (75/25) isophthalate-co-5-sodiosulfoisophthalate (80/20)].

A mixture of 155.2 g (0.80 mole of dimethylisophthalate, 57.2 g (0.20 mole) of dimethyl-5-sodiosulfoisophthalate, 109.2 g (0.25 mole) of 1,4,5,8-naphthalenetetracarbonyl-bis( 5-hydroxypentyl)imide, and 111.3 g (1.05 mole) of 2,2'-oxydiethanol contained in a polymerization flask equipped with a Claisen head and a nitrogen inlet tube was heated to 200° C. under a nitrogen atmosphere to produce a transparent, burgundy, homogenous melt. The polycondensation step was the same as that employed for Comparative Polymer D. The resulting polymer E-1 has an inherent viscosity of 0.58 dl/g, a glass transition temperature of 72° C., and a weight average molecular weight of 64,0000.

Polymer E-2: Poly[2,2'-oxydiethylene-co-1,4,5,8-naphthalenetetracarbonyl-bisimido-5-petamethylene (75/25) isophthalate-co-5-sodioisophthalate (60/40).

The procedure was the same as for polymer E1 except that the diesters consisted of 116.4 g (0.60 moles) of dimethylisophthalate and 118.4 g (0.400 moles) of dimethyl-5-sodiosulfoisophthalate. The polycondensation reaction was carried out in the same manner and the resulting polymer had an inherent viscosity of 0.24 dl/g, a glass transition temperature of 92° C., and a weight average molecular weight of 16,500.

Polymer E-3: Poly[2,2'-oxydiethylene-co-1,4,5,8-naphthalenetetracarbonyl-bisimido-5-petamethylene (75/25) isophthalate-co-5-sodioisophthalate (50/50).

The procedure was the same as for polymer E1 except that the diesters consisted of 97.0 g (0.50 moles) of dimethylisophthalate and 148 g (0.50 moles) of dimethyl-5-sodiosulfoisophthalate. The polycondensation reaction was carried out in the same manner and the resulting polymer had an inherent viscosity of 0.12 dl/g, a glass transition temperature of 92, and a weight average molecular weight of 12,500.

Polymer F: Poly [2,2'-oxydiethylene-co-1,4,5,8-naphthalenetetracarbonyl-bisimido-2-ethoxyethylene (80/20) isophthalate-co-5-sodiosulfoisophthalate (80/20)].

The procedure was the same as for polymer E-1 except that the glycol mixture consisted of 88.4 g (0.20 mole) of 1,4,5,8-naphthalenetetracarbonyl-bis(2-hydroxyethoxyethyl)imide and 118.7 g (1.12 mole) of 2.2'-oxydiethanol. The resulting polymer F had an inherent viscosity of 0.55 dl/g, a glass transition temperature of 68° C., and a weight average molecular weight of 65,000.

Polymer G: Poly [1,4,5,8-naphthalenetetracarbonyl-bisimido-2-ethoxyethylene-co-2,2'-oxydiethylene (60/40) isophthalate-co-sodiosulfoisophthalate (80/20)].

The procedure was the same as for polymer E-1 except that the glycol mixture consisted of 265.2 g (0.60 moles) of 1,4,5,8-naphthalenetetracarbonyl-bis(2-hydroxyethoxyethyl)imide and 59.4 g (0.56 moles of 2,2'-oxydiethanol. The resulting polymer G had an inherent viscosity of 0.58 dl/g, a glass transition temperature of 82° C., and a weight average molecular weight of 61,000.

Polymer H: Poly [1,4,5,8-naphthalenetetracarbonyl-bisimido-2-ethoxyethylene-co-2,2'-oxydiethylene (80/20) isophthalate-co-5-sodiosulfoisophthalate (80/20)].

The procedure was the same as for polymer E-1 except that the glycol mixture consisted of 353.6 g (0.80 mole) of 1,4,5,8-naphthalenetetracarbonyl-bis(2-hydroxyethoxyethyl)imide and 29.7 g (0.28 mole) of 2,2'-oxydiethanol. The resulting polymer H had an inherent viscosity of 0.54 dl/g, a glass transition temperature of 92° C. and a weight average molecular weight of 56,000.

Polymer I: Poly[1,4,5,8-naphthalenetetracarbonyl-bis2-ethoxyethylene-co-2,2'-oxydiethylene (40/60) isophthalate-co-5-sodiosulfoisophthalate (80/20)].

The procedure were the same as for polymer E-1 except that the glycol mixture consisted of 89.1 g (0.84 mole) of 2,2'-oxydiethanol and 176.8 g (0.40 mole) of 1,4,5,8-naphthalenetetracarbonyl bis(2-ethoxyethanol)imide. The resulting polymer I had an inherent viscosity of 0.58 dl/g, a glass transition temperature of 79° C., and a weight average molecular weight of 105,000.

The polyesterionomer-co-imide examples described above and their responses to changes in relative humidity are listed in Table II.

TABLE II

POLYESTERIONOMER-CO-IMIDES

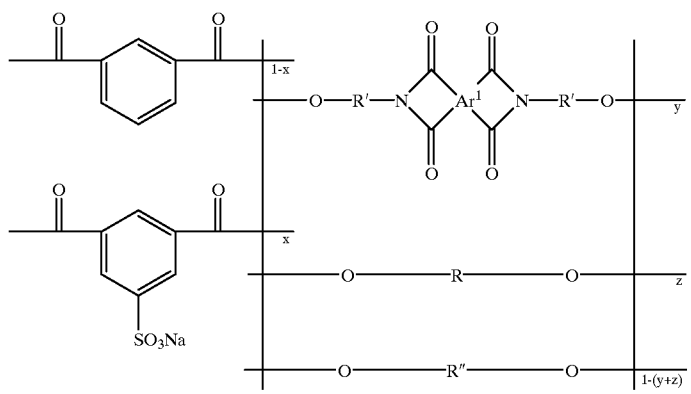

| Polymer | x | 1 − x | y | 1 − (y + z) | z | R | R' | R" | % Water Loss From 70 F./60% RH To 80 F./20% RH |
|---|---|---|---|---|---|---|---|---|---|
| Comparative Polymer D | 0.11 | 0.89 | 0 | 0.78 | 0.22 | $-(CH_2)_2-O-(CH_2)_2-$ | | $-(CH_2)_2-$ | |
| E-1 | 0.20 | 0.80 | 0.25 | 0 | 0.75 | $-(CH_2)_2-O-(CH_2)_2-$ | $-(CH_2)_5-$ | | 0.061 |

TABLE II-continued

POLYESTERIONOMER-CO-IMIDES

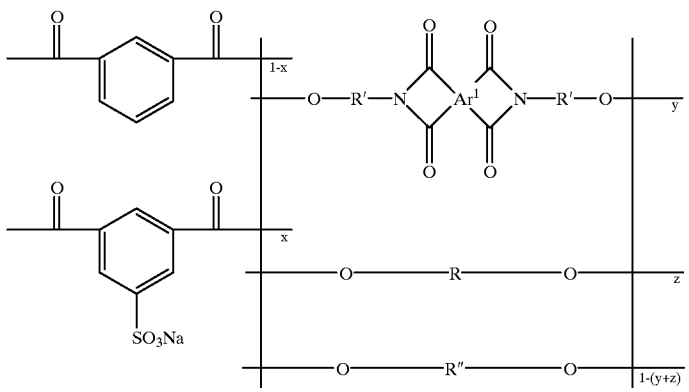

| Polymer | x | 1 − x | y | 1 − (y + z) | z | R | R' | R" | % Water Loss From 70 F./60% RH To 80 F./20% RH |
|---|---|---|---|---|---|---|---|---|---|
| E-2 | 0.40 | 0.60 | 0.25 | 0 | 0.75 | −(CH$_2$)$_2$−O−(CH$_2$)$_2$− | −(CH$_2$)$_5$− | | |
| E-3 | 0.50 | 0.50 | 0.25 | 0 | 0.75 | −(CH$_2$)$_2$−O−(CH$_2$)$_2$− | −(CH$_2$)$_5$− | | 0.698 |
| F | 0.20 | 0.80 | 0.20 | 0 | 0.80 | −(CH$_2$)$_2$−O−(CH$_2$)$_2$− | −(CH$_2$)$_2$−O− | | 0.179 |
| G | 0.20 | 0.80 | 0.60 | 0 | 0.40 | −(CH$_2$)$_2$−O−(CH$_2$)$_2$− | −(CH$_2$)$_2$−O− | | 0.295 |
| H | 0.20 | 0.80 | 0.80 | 0 | 0.20 | −(CH$_2$)$_2$− | −(CH$_2$)$_2$−O− | | 0.656 |
| I | 0.20 | 0.80 | 0.40 | 0 | 0.60 | −(CH$_2$)$_2$−O−(CH$_2$)$_2$− | −(CH$_2$)$_2$−O− | | |

POLYAMIDE-CO-IMIDE EXAMPLES

The novel polyamide-co-imides of the invention were also prepared by known techniques of melt phase polycondensation, as described by Sorenson et al, cited above, pp. 62–64.

The control of reaction stoichiometry is required in order to achieve both high conversion and molecular weight. The examples of the invention were prepared by melt phase polycondensation from either combinations of the appropriate diacids and diamines or the salts of these diacids and diamines.

Comparative Polymer J: This comparative polymer is a coimmercially available aliphatic polyamide sold under the trade name "Amilan CM8000" by Toray Co., Ltd. of Japan. This polymer is identified in U.S. Pat. No. 5,876,889, which is incorporated herein by reference, as 6/66/610/12 copolymerized nylon. Identification of the monomers which form the 6/66/610/12 copolymer are:

nylon 6 monomer, —[NH(CH$_2$)$_5$CO]—;

nylon 66 monomer, —[NH(CH$_2$)$_6$NHCO(CH$_2$)$_4$CO]—;

nylon 610 monomer, —[NH(CH$_2$)$_6$NHCO(CH$_2$)$_8$CO]—;

and nylon 12 monomer, —[NH(CH$_2$)$_{11}$CO]—.

Comparative Polymer K: Poly[dodecamethylene-co-piperazino (50/50) 1,1,3-trimethylphenylindane-co-dodecamethylene (50/50)]amide.

A mixture of 162 g (0.50 mole) of 1,1,3-trimethyl-3-(4-carboxyphenyl)-5-indancarboxylic acid, 115.15 g (0/.50 mole) of dodecanedioic acid, 43 g (0.50 mole) of piperazine, and 100 g (0.50 mole) of dodecanediamine were combined in a polymerization flask equipped with side arm and gas inlet tube. The contents were heated to 220° C. under a positive argon atmosphere to achieve a clear, homogenous melt. The polymerization temperature was raised from 220° C. to 280° C. over a period of four hours or until the evolution of distillate terminated. The flask was then equipped with a stirrer and connected to a source of vacuum. The resulting product was collected as a tough, amorphous solid which had a glass transition temperature of 89° C. and a weight average molecular weight of 105,000.

Polymer L: Poly[1,3,3-trimethylcyclohexylmethylene 1,4,5,8-naphthalenetetracarbonyl-bis(imido-3-propylene)-co-dodecamethylene (20/80)]amide.

A mixture of 184.2 g (0.80 moles) dodecandioic acid, 126.8 g (0.20 moles) of 1,4,5,8-naphthalenetetracarbonyl-bis(11-undecanoic acid)imide, and 170.3 g (1.00 moles) 5-amino-1,3,3-trimethylcyclohexanemethylamine contained in a polymerization flask equipped with a Claisen head and a nitrogen inlet tube was heated to 220° C. under a nitrogen atmosphere to produce a dark burgundy, homogeneous melt. The temperature was slowly raised to 280° C. over several hours. Heating was continued until no further distillate was observed. A mechanical stirrer was introduced, and the flask was connected to a source of vacuum. The mixture was stirred under vacuum at 280° C. for about two hours, or until the desired melt viscosity was achieved, then the product was allowed to cool to room temperature. The resulting polymer L was soluble in mixed solvents such as dichloromethane-methanol, and had a glass transition temperature of 102° C. and a weight average molecular weight of 80,000.

Polymer M: Poly[dodecamethylene-co-1,4-piperazino (35/65) 1,4,5,8-napthalenetetracarbonyl-bis(imido-3-propylene)-co-dodecamethylene (90/10)]amide.

A mixture of 205.7 g (0.65 moles) dipiperazonium dodecanedioate, 107.6 g (0.25 moles), hexamethylenediammonium dodecanedioate, and 63.8 g (0.10 moles) hexamethylenediammonium 1,4,5,8-naphthalenetetracarbonyl-bisimido-3-propionate was combined as per example polymer L and subjected to the same polycondensation procedure. The resulting polymer M had solubility in mixed solvents, a crystalline melting point of 114° C. and a weight average molecular weight of 72,500.

Polymer N: Poly[1,3,3-trimethylcyclohexane-1,5-methylene-1,4,5,8-naphthalenetetracarbonyl-bis(imido-11-undecamethylene)]amide.

A mixture of 634 g (1.00 moles) 1,4,5,8-naphthalenetetracarbonyl-bis(11-undecanoic acid)imide and 170.3 g (1.00 moles) 5-amino-1,3,3-trimethylcyclohexanemethylamine was combined as per polymer example L and subjected to the same polycondensation procedure. The resulting polymer N exhibited solubility in dichloromethane-methanol, a crystalline melting point of 172° C. and a weight average molecular weight of 105,000.

Polymer O: Poly[1,3,3-trimethylcyclohexane-1,5-methylene dodecamethylene-co-1,4,5,8-naphthalenetetracarbonyl-bis(imido-11-undecamethylene) (90/10)]amide.

A mixture of 200.3 g (1.00 moles) 1,3,3-trimethylcyclohexanemethyldiammonium dodecandioate and 304.2 g (1.00 moles) 1,3,3-trimethylcyclohexanemethyldiammonium 1,4,5,8-naphthalenetetracarbonyl-bisimido-3-propionate was combined as per polymer example L and subjected to the same polycondensation procedure. The resulting polymer O exhibited solubility in a mixture of dichloromethane-methanol and had a glass transition temperature of 152° C. and a weight average molecular weight of 25,000.

Polymer P: Poly[1,3,3-trimethylcycylohexane-1,5-methylene 1,4,5,8-naphthalenetetracarbonyl-bis(imido-11-undecamethylene)amide-co-dodecamethylene (60/40)] amide.

A mixture of 80.1 g (0.20 moles) 1,3,3-trimethylcyclohexanemethyldiammonium dodecanedioate, 253.5 g (0.40 moles), and 68.1 g (0.40 moles) 5-amino-1,3,3-trimethylcyclohexanemethyamine was combined as per polymer example L and subjected to the same polycondensation procedure. The resulting polymer P exhibited solubility in a mixture of dichloromethane-methanol, had a glass transition temperature of 113° C. and a weight average molecular weight of 141,000.

Polymer Q: Poly[decamethylene-co-piperazino (70/30) decamethylene-co-1,1,3-trimethyl-3(4-phenylindanyl-co-1, 4,5,8-naphthalenetetracarbonyl-bisimidopropylene (50/30/20)]amide.

A mixture of 115.15 g (0.50 moles) of docecanedioic acid, 96.2 g (0.30 moles) of 1,1,3-trimethyl-3-(4-carboxyphenyl)-5-indancarboxylic acid, 87.6 g (0.20 moles) of 1,4,5,8-napthalenetetracarbonyl-bis(3-carboxypropyl)imide, 47.6 g (0.70 moles) of 1,4-piperazine, and 69.1 g (0.30 moles of dodecane diamine was combined in a polymerization flask equipped with side arm and gas inlet tube, heated to 200° C. to achieve a homogeneous, optically transparent, dark burgundy melt. The temperature was raised from 220° C. to 280° C. and maintained until no further distillate was detected. The flask was then equipped with a stirrer, fitted to a vacuum source, and polymerized to moderate-high melt viscosity. The resulting product had a glass transition temperature of 90° C. and a weight average molecular weight of 81,000.

Polyamide-co-imide examples of the invention and comparative polymers are shown in Table III with their respective responses to changes in relative humidity.

In the novel polyamide-co-imide of the invention as depicted by formula in Table III, $Ar^1$ represents a tetravalent aromatic group of 6 to 20 carbon atoms, R and $R^1$ independently represent alkylene or alkylenoxy groups of 2 to 12 carbon atoms, R" and R'" independently represent alkylene groups of 2 to 12 carbon atoms, x is a mole fraction from 0.05 to 1, y is a mole fraction from 0 to 0.95 and z is a mole fraction from 0 to 0.95.

TABLE III
POLYAMIDE-CO-IMIDES
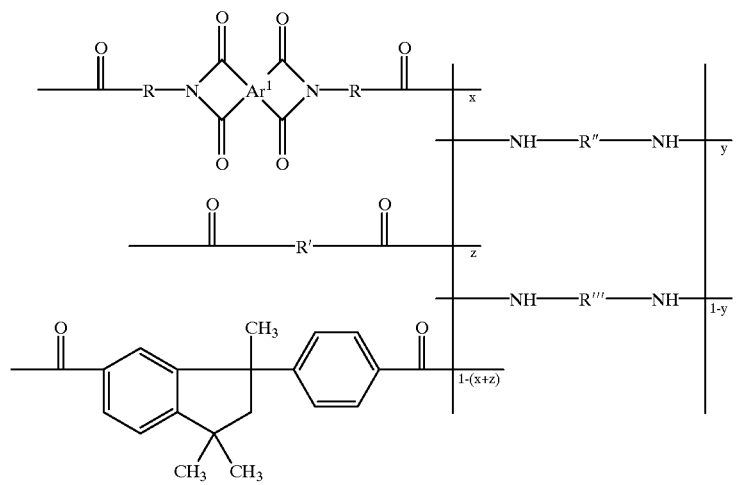
| Polymer | x | z | 1 − (x + z) | y | 1 − y | R | R' | R" | R''' | % Water Loss From 70 F./ 60% RH to 80 F./20% RH |
|---|---|---|---|---|---|---|---|---|---|---|
| Comparative Polymer J | 0 | | | | | | | | | 1.276 |
| Comparative Polymer K | 0 | 0.50 | 0.50 | 0.50 | 0.50 | ─(CH₂)₁₀─ | | ![piperazine] N─⬡─N | ─(CH₂)₁₂─ | |
| L | 0.20 | 0.80 | | 1.00 | 0 | ─(CH₂)₁₀─ | ─(CH₂)₁₀─ | ─CH₂─(trimethylcyclohexyl) | | 0.172 |
| M | 0.10 | 0.90 | | 0.35 | 0.65 | ─(CH₂)₃─ | ─(CH₂)₁₀─ | ─CH₂─(trimethylcyclohexyl) | | 0.207 |
| N | 1.00 | 0 | | 1.00 | 0 | ─(CH₂)₁₀─ | | ─CH₂─(trimethylcyclohexyl) | | 0.236 |
| O | 0.10 | 0.90 | | 1.00 | 0 | ─(CH₂)₁₀─ | ─(CH₂)₁₀─ | ─CH₂─(trimethylcyclohexyl) | | 0.244 |

TABLE III-continued

POLYAMIDE-CO-IMIDES

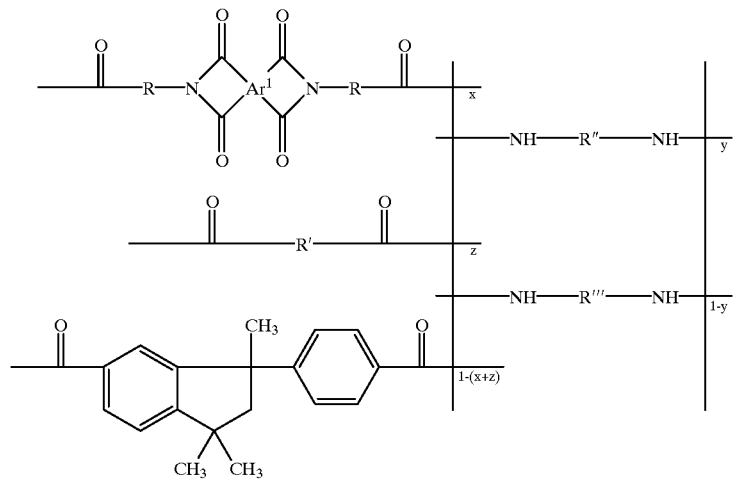

| Polymer | x | z | 1 − (x + z) | y | 1 − y | R | R' | R" | R''' | % Water Loss From 70 F./ 60% RH to 80 F./20% RH |
|---|---|---|---|---|---|---|---|---|---|---|
| P | 0.40 | 0.60 | | 1.00 | 0 | $-\text{[CH}_2\text{]}_{10}-$ | $-\text{[CH}_2\text{]}_{10}-$ | (3,3,5-trimethylcyclohexyl-CH₂ group) | | 0.656 |
| Q | 0.20 | 0.50 | 0.30 | 0.70 | 0.30 | $-\text{[CH}_2\text{]}_{3}-$ | $-\text{[CH}_2\text{]}_{10}-$ | (piperazine group) | $-\text{[CH}_2\text{]}_{12}-$ | |

Tables I, II and III show that the percent water loss for the polymers employed in the photoconductive elements of the invention was much smaller than the water loss for the comparative polymers which contained no planar, electron-deficient aromatic tetracarbonylbisimide group and which absorbed and lost relatively large amounts of water with humidity changes. As a result, the comparative polymers are susceptible to substantial variation in conductivity when employed in a barrier layer.

The examples which follow describe the preparation and testing of photoconductive elements of the invention and of comparative photoconductive elements. They are referred to, respectively, as "examples" and as "comparative examples."

COMPARATIVE EXAMPLE 1

A multiactive photoconductive film comprising a conductive support, a barrier layer, a charge generation layer (CGL), and a charge transport (CTL), coated in that order, was prepared from the following compositions and conditions.

Coated on nickelized poly (ethylene) terephthalate, at dry coverage of 0.05 g/ft² was a barrier layer of Amilan CM8000 polyamide having no planar tetracarbonylbisimide repeating unit. The barrier layer was prepared at 2.5 wt % in a 65/35 (wt/wt) mixture of ethanol and dichloromethane. A coating surfactant, SF1023, was added at a concentration of 0.003 wt % of the total solution.

A second layer (CGL) was coated on the barrier layer at a dry coverage of 0.05 g/ft² The CGL mixture comprised 50% of a 75/25 cocrystalline pigment mixture of titanyl phthalocyanine and tetrafluoro titanyl phthalocyanine, prepared as described in Molaire et al U.S. Pat. No. 5,614,342 and 50% of a polyester ionomer binder, poly [2,2-dimethyl-1,3-propylene-co-oxydiethylene (80/20) isophthalate-co-5-sodiosulfoisophthalate (95/5)] prepared as described in Molaire et al. U.S. Pat. No. 5,733,695. The CGL mixture was prepared at 3 wt % in a 65/35 (wt/wt) mixture of dichloromethane and 1,1,2-trichloroethane, as described in U.S. Pat. No. 5,614,342. A leveling agent, DC510 was added at a concentration of 0.019 wt %.

A third layer (CTL) was coated onto the CGL at a dry coverage of 2.3 g/ft². The CTL mixture comprised 50-wt % Makrolon 5705, 10% poly [4,4'-(norbornylidene) bisphenol terephthalate-co-azelate (60/40)], 20 wt % of 1,1-bis[4-(di-4-tolylamino)phenyl]cyclohexane, 20 wt % tri-(4-tolyl) amine. The CTL mixture was prepared at 10 wt % in dichloromethane. A coating surfactant, DC510, was added at a concentration of 0.016 wt % of the total mixture. cl COMPARATIVE EXAMPLE 2

The photoconductive element was prepared as described in Comparative Example 1, except that the barrier layer polymer was AQ38S polyesterionomer, having no planar tetracarbonylbisimide moiety, sold by Eastman Chemical Company. The barrier layer solution was prepared at 5 wt % deionized water. A coating surfactant, Olin 10G was added at a concentration of 0.07 wt % of the total solution. The barrier layer was coated at a dry coverage of 0.05 g/ft$^2$.

EXAMPLE 1

The photoconductor was prepared as described in Comparative Example 1, except that the barrier layer polymer was polyesterionomer-co-imide E-1 of Table II. The barrier layer solution was prepared at 2 wt % in deionized water. A coating surfactant, Olin 10G, was added at a concentration of 0.45 wt % of the total solution. The barrier layer was coated at a dry coverage of 0.05 g/ft$^2$.

EXAMPLE 2

The photoconductor was prepared as described in Comparative Example 1, except that the barrier layer polymer was polyesterionomer-co-imide I of Table II. The barrier layer solution was prepared at 2 wt % in deionized water. A coating surfactant, Olin 10G, was added at a concentration of 0.45 wt % of the total solution. The barrier layer was coated at a dry coverage of 0.05 g/ft$^2$.

EXAMPLE 3

The photoconductor was prepared as described in Comparative Example 1, except that the barrier layer polymer was polyesterionomer-co-imide G of Table II. The barrier layer solution was prepared at 2 wt % in deionized water. A coating surfactant, Olin 10G, was added at a concentration of 0.45 wt % of the total solution. The barrier layer was coated at a dry coverage of 0.05 g/ft$^2$.

EXAMPLE 4

The photoconductor was prepared as described in Comparative Example 1, except that the barrier layer polymer was polyesterionomer-co-imide F of Table II. The barrier layer solution was prepared at 2 wt % in deionized water. A coating surfactant, Olin 10G, was added at a concentration of 0.45 wt % of the total solution. The barrier layer was coated at a dry coverage of 0.05 g/ft$^2$.

Although the described condensation polymers having aromatic tetracarboxylbisimide groups are valuable when used as the sole polymer of the barrier layer provide, as demonstrated by the examples herein, the invention also includes barrier layers comprising a blend of such polymers with other polymers such as the Amilan CM8000 aliphatic copolyamide previously described herein. The following examples 5, 6 and 7 describe such compositions. Their useful properties are illustrated by the results recorded in Table IV hereinafter.

EXAMPLE 5

The photoconductor was prepared as described in Comparative Example 1, except that the barrier layer was a 75/25 wt/wt mixture of Amilan CM8000 aliphatic polyamide and the polyesterionomer-co-imide F of Table II. The barrier layer solution was prepared at 2 wt % in a methanol/water mixture. A coating surfactant, Olin 10G, was added at a concentration of 0.45 wt % of the total solution. The barrier layer was coated at a dry coverage of 0.05 g/ft$^2$.

EXAMPLE 6

The photoconductor was prepared as described in Example 5, except that the barrier layer was a 75/25 wt/wt mixture of Amilan CM8000 aliphatic polyamide and the polyesterionomer-co-imide E of Table II.

EXAMPLE 7

The photoconductor was prepared as described in Example 5, except that the barrier layer was a 50/50 wt/wt mixture of Amilan CM8000 aliphatic polyamide and the polyesterionomer-co-imide E of Table II.

EVALUATION

The films were tested in a laboratory apparatus that charges, exposes and erases the film continuously. The residual or "toe" voltage after 2000 cycles was recorded for each film. The results of Table IV show that the examples of the invention outperform the comparative examples.

TABLE IV

| | | Absolute Residual Potential after 2,000 cycles | |
|---|---|---|---|
| Example | Barrier Polymer | 25° C. 50% RH | 25° C. 20% RH |
| Comp Example 1 | Amilan CM8000 | 46 V | 108 V |
| Comp Example 2 | AQ38S | 167 V | |
| Example 1 | Polymer E | 47 V | 33 V |
| Example 2 | Polymer I | 44 V | 28 V |
| Example 3 | Polymer G | 50 V | 33 V |
| Example 4 | Polymer F | 43 V | 40 V |
| Example 5 | Amilan CM8000/Polymer F 75/25 | 74 V | 80 V |
| Example 6 | Amilan CM8000/Polymer E 50/50 | 62 V | 65 V |
| Example 7 | Amilan CM8000/Polymer E 75/25 | 56 V | 66 V |

Evaluation of Regeneration Stability

Figure 2:
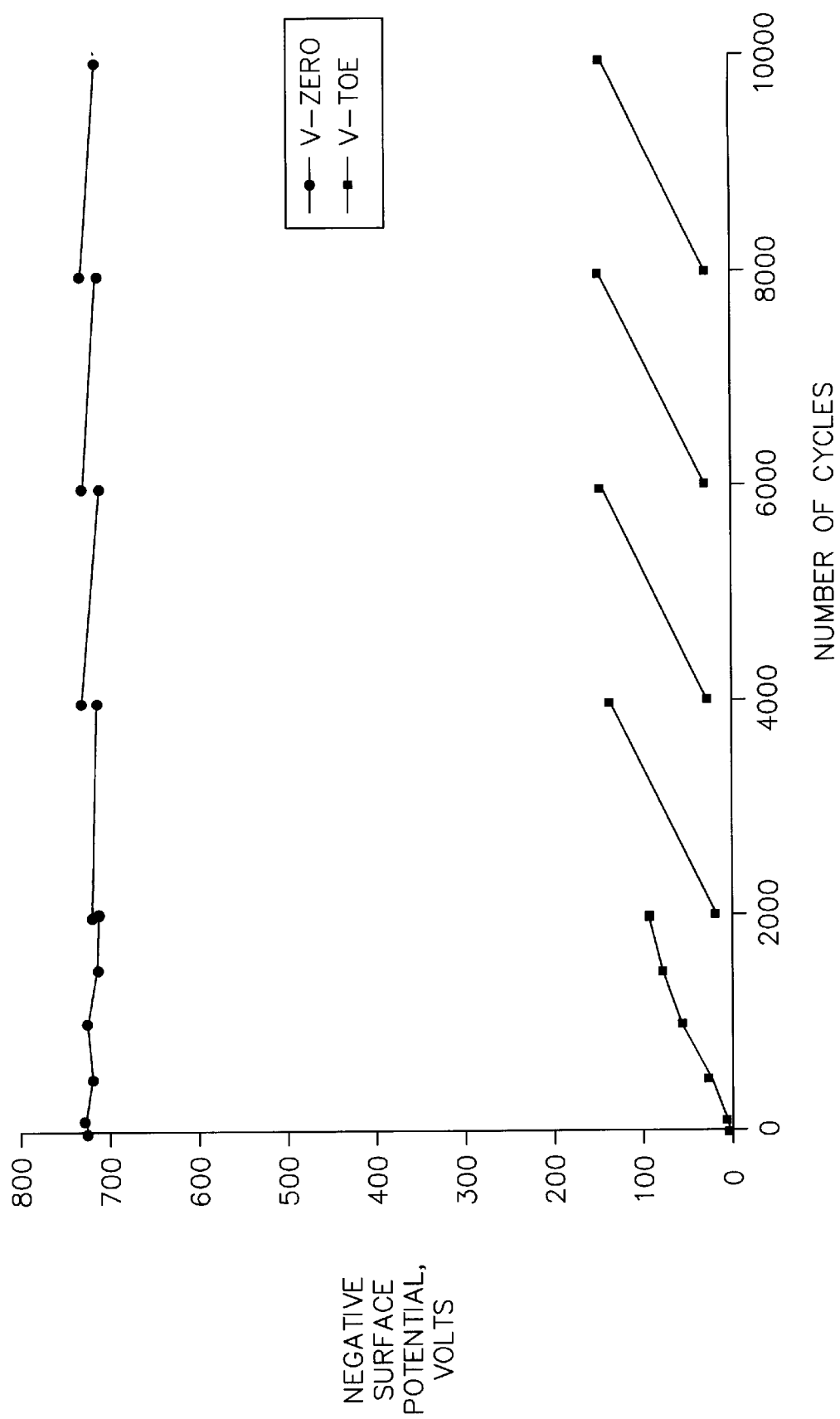
Figure 3:
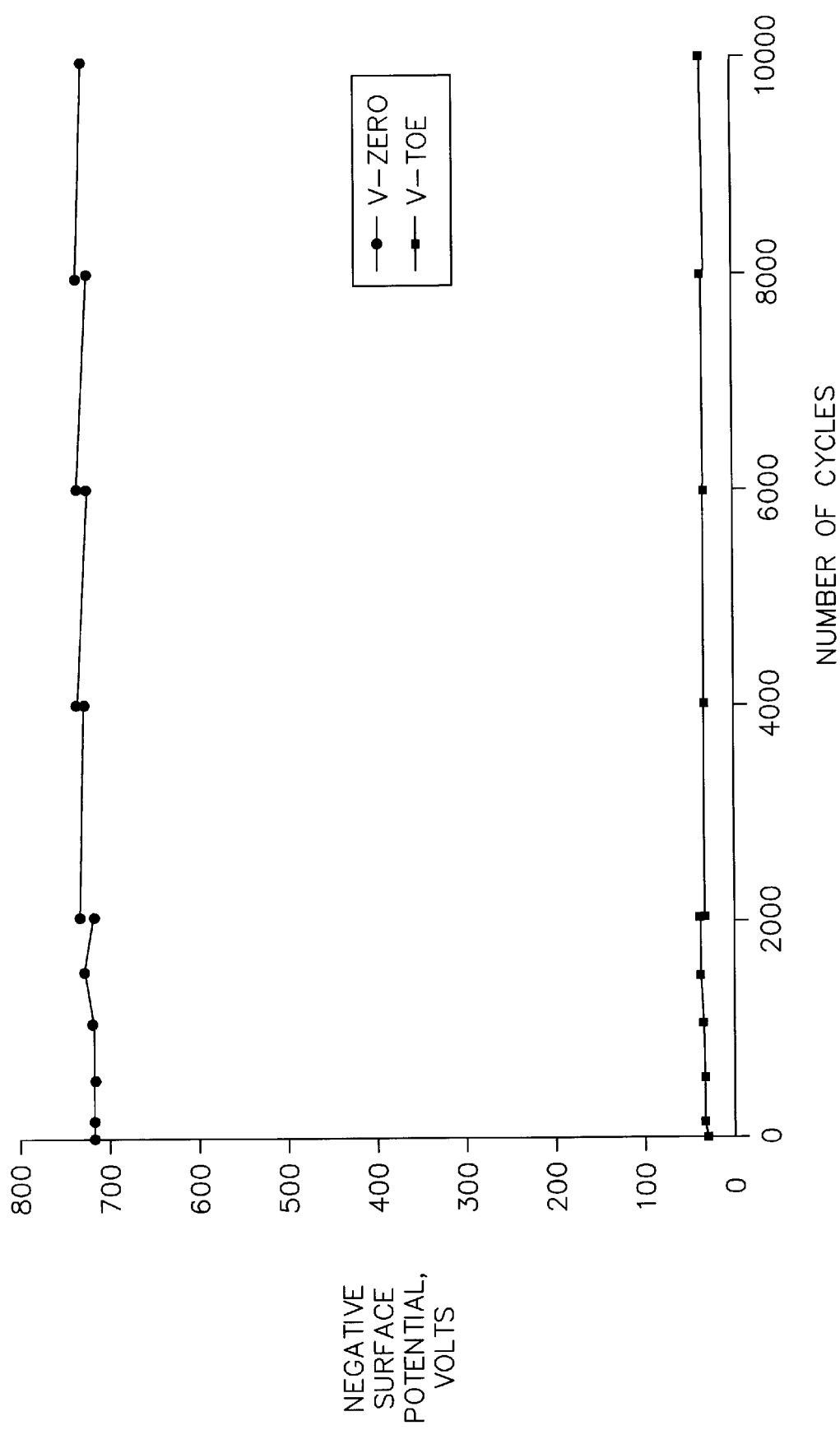
Figure 4:
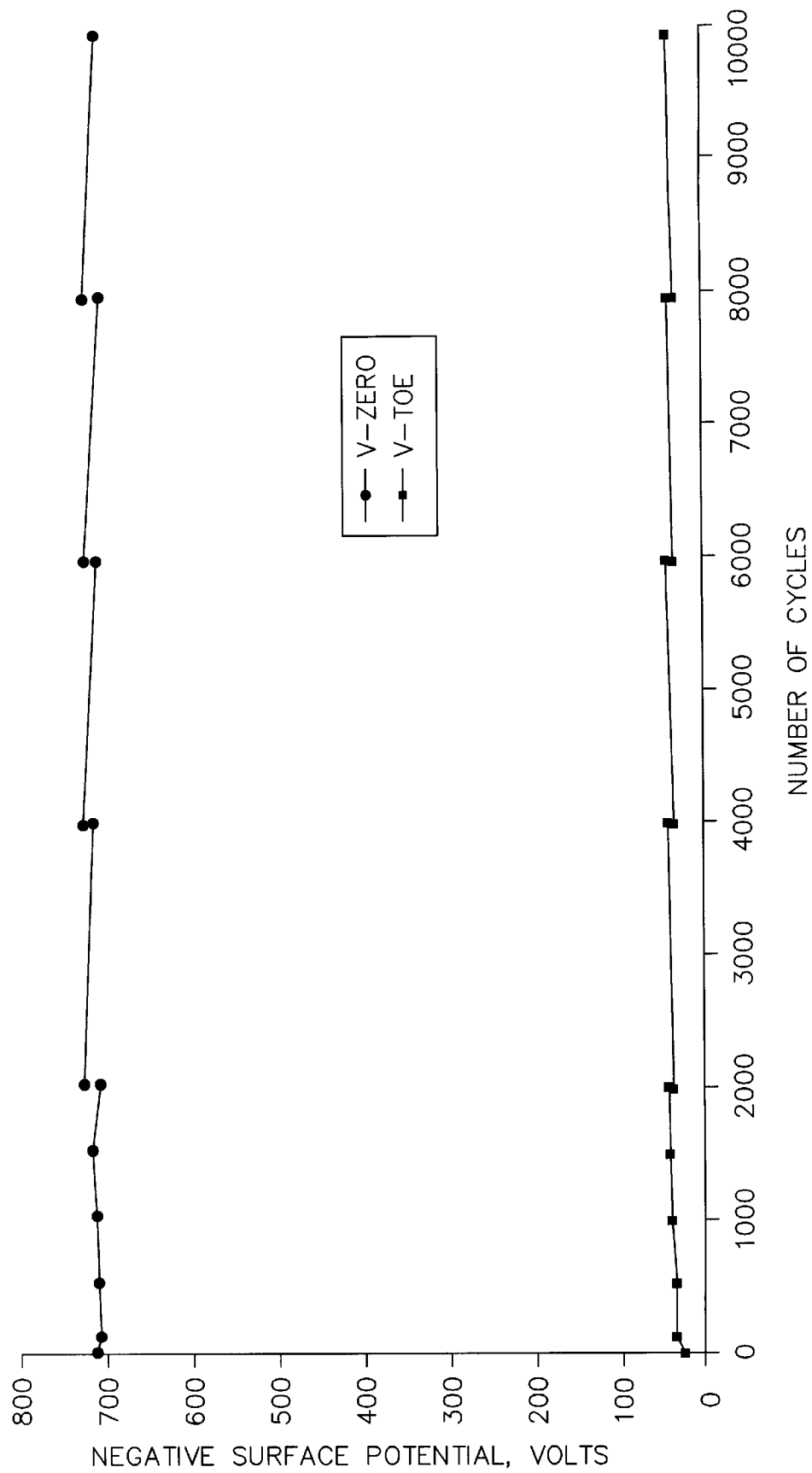
Figure 5:
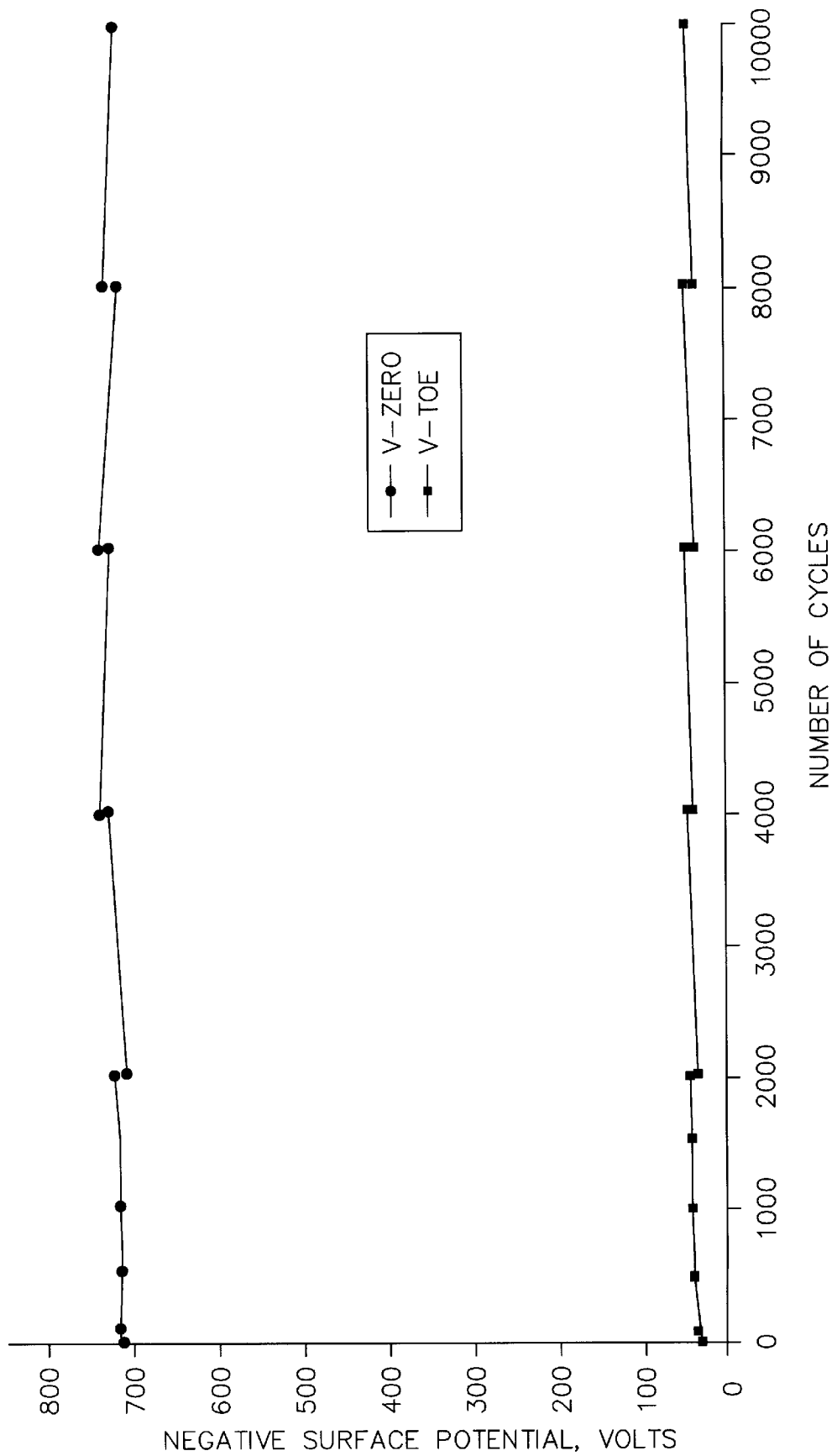

It is essential for an electrophotographic or photoconductive element that is cycled many times in the electrophotographic process to maintain stable residual voltages close to zero during use. Longer regeneration cycles were run for comparative example 1 and invention examples 1, 6 and 7. The machine was stopped after every 2000 cycles for one hour and started again until 10,000 cycles were reached. The results are shown in FIGS. 2, 3, 4 and 5 of the drawing. These figures are plots of the negative surface potential, in volts, for the indicated photoconductive elements for V$_0$, i.e., the voltage after charging and before exposure and for the "toe voltage" which is the residual voltage on the photoconductive surface after full exposure. As shown in FIG. 2, for comparative example 1, the toe voltage rose substantially at 2000 cycles but dropped back to the original value after the one-hour rest, only to climb back up again in the next 2000 cycles burst. FIGS. 3, 4 and 5 show that the examples of the invention, i.e., examples 1, 6, and 7, are more stable.

Evaluation of Electroformed Nickel Substrate

COMPARITIVE EXAMPLE 3

A multiactive photoconductive element comprising an endless conductive nickel sleeve 180 mm diameter, 5 mil thick and 395 mm long, manufactured by Stork Rotaform, a barrier layer, a charge generation layer (CGL), and a charge transport (CTL), coated in that order, was prepared as follows:

Coated on the endless seamless nickel sleeve using the dip coating process, at dry coverage of 0.15 g/ft$^2$ was a barrier layer of Amilan CM8000 polyamide. The barrier layer was prepared at 3.5 wt % in a 65/35 (wt/wt) mixture of ethanol and dichloromethane. A coating surfactant, SF1023, was added at a concentration of 0.003 wt % of the total solution.

A second layer (CGL) was coated on the barrier layer at a dry coverage of 0.05 g/ft$^2$. The CGL mixture comprised 50% of a 90/10 cocrystalline pigment mixture of titanyl pthalocyanine and tetrafluoro titanyl phthalocyanine, prepared as described in Molaire et al U.S. Pat. No. 5,614,342 and 50% of a polyester ionomer binder, poly [2,2-dimethyl-1,3-propylene-co-oxydiethylene (80/20) isophthalate-co-5-sodiosulfoisophthalate (95/5)] (prepared as described in Molaire et al., U.S. Pat. No. 5,733,695. The CGL mixture was prepared at 3 wt % in a 65/35 (wt/wt) mixture of dichloromethane and 1,1,2-trichloroethane, as described in U.S. Pat. No. 5,614,342. A leveling agent, DC510 was added at a concentration of 0.019 wt %.

A third layer (CTL) was coated onto the CGL at a dry coverage of 2.3 g/ft$^2$. The CTL mixture comprised 30 wt % Makrolon 5705 polymer, 20% Lexan polymer, 10% poly [4,4'-(norbornylidene-bisphenol terephthalate-co-azelate (60/40)], 20 wt % of 1,1-bis[4-(di-4-tolylamino)phenyl] cyclohexane, 20 wt % tri-(4-tolyl)amine. The CTL mixture was prepared at 10 wt % in dichloromethane. A coating surfactant, DC510, was added at a concentration of 0.016 wt % of the total mixture.

EXAMPLE 8

A photoconductive element of the invention was prepared as described in Comparative Example 3, except that the barrier layer was the polyesterionomer-co-imide G of Table II. The barrier layer solution was prepared at 3.5 wt % in a 65/35 (wt/wt) mixture of ethanol and deionized water. A coating surfactant, Olin 10G, was added at a concentration of 0.45 wt % of the total solution. The barrier layer was coated at a dry coverage of 0.12 g/ft$^2$. The CGL was coated out of 100% tetrahydrofuran as a solvent.

Comparative Example 3 and invention Example 8 were evaluated in an experimental high speed coating machine. The residual or toe voltage for each cylinder was measured initially and after 1000 cycles. The results are shown in Table V. The barrier layer of the invention shows markedly more stable performance at 25% RH than the comparative example.

TABLE V

| Example | Barrier Polymer | Vexposed @ 25% RH Initial | Vexposed @ 25% RH 1000 cycles | Delta |
|---|---|---|---|---|
| Comp Example 3 | Amilan CM8000 on Nickel sleeve | 160 V | 238 V | +78 V |
| Example 8 | Polymer G on Nickel sleeve | 181.6 V | 185.6 V | +4 V |

The following comparative example 4 and invention examples 9, 10, 11 and 12 demonstrate the effect of barrier layer thickness on the regeneration of photoconductive films.

COMPARATIVE EXAMPLE 4

The photoconductor was prepared as described in Comparative Example 1, except that the charge generation layer was coated at 0.10 g/ft$^2$.

EXAMPLE 9

The photoconductor was prepared as described in Comparative Example 4, except that the barrier layer polymer was polyesterionomer-co-imide E-2 of Table II. The barrier layer solution was prepared at 2 wt % in deionized water. A coating surfactant, Olin 10G, was added at a concentration of 0.45 wt % of the total solution. The barrier was coated at a dry coverage of 0.1 g/ft$^2$.

EXAMPLE 10

The photoconductor was prepared as described in Comparative Example 4, except that the barrier layer polymer was polyesterionomer-co-imide E-2 of Table II. The barrier layer solution was prepared at 2 wt % in deionized water. A coating surfactant, Olin 10G, was added at a concentration of 0.45 wt % of the total solution. The barrier was coated at a dry coverage of 0.2 g/ft$^2$.

EXAMPLE 11

The photoconductor was prepared as described in Comparative Example 4, except that the barrier layer polymer was polyesterionomer-co-imide E-3 of Table II. The barrier layer solution was prepared at 2 wt % in deionized water. A coating surfactant, Olin 10G, was added at a concentration of 0.45 wt % of the total solution. The barrier was coated at a dry coverage of 0.5 g/ft$^2$.

EXAMPLE 12

The photoconductor was prepared as described in Comparative Example 4, except that the barrier layer polymer was polyesterionomer-co-imide E-3 of Table II. The barrier layer solution was prepared at 2 wt % in deionized water. A coating surfactant, Olin 10G, was added at a concentration of 0.45 wt % of the total solution. The barrier was coated at a dry coverage of 0.2 g/ft$^2$.

EVALUATION

The photoconductor films were tested in an apparatus that charges, exposes and erases the film continuously. The residual voltage after 1000 cycles (toe @ 20% RH) was recorded for each film. The results show that the examples of the invention, even with substantially thicker barrier layers, outperform the comparative example by exhibiting lower differences between the initial toe voltage and the voltage after 1000 cycles, as recorded in the "Delta" column of Table VI.

TABLE VI

| Example | Barrier Polymer | Thickness g/ft$^2$ | $V_{toe}$ @ 25° C./20% RH Initial | $V_{toe}$ @ 25° C./20% RH 1000 cycles | Delta |
|---|---|---|---|---|---|
| Comparative Example 4 | CM8000 Amilan | 0.05 | −9 | −75 | 66 |
| Example 9 | Polymer E-2 | 0.05 | −11 | −21 | 10 |
| Example 10 | Polymer E-2 | 0.2 | −50 | −78 | 28 |
| Example 11 | Polymer E-3 | 0.05 | −13 | −19 | 6 |
| Example 12 | Polymer E-3 | 0.2 | −31 | −38 | 7 |

COMPARARIVE EXAMPLE 4A

The photoconductor was prepared as described in Comparative Example 1, except that the barrier layer polymer was Amilan CM8000 polyamide. The barrier layer was prepared at 2.5 wt % in a 65/35 (wt/wt) mixture of ethanol and dichloromethane. A coating surfactant, SF1023, was added at a concentration of 0.003 wt % of the total solution. The barrier layer was coated at a dry coverage of 0.10 g/ft$^2$.

COMPARATIVE EXAMPLE 5

The photoconductor was prepared as described in Comparative Example 1, except that the barrier layer polymer was comparative polyamide K of Table III. The barrier layer was prepared at 2.5 wt % in a 65/35 (wt/wt) mixture of ethanol and dichloromethane. A coating surfactant, SF1023, was added at a concentration of 0.003 wt % of the total solution. The barrier layer was coated at a dry coverage of 0.10 g/ft$^2$.

EXAMPLE 13

A photoconductive element of the invention was prepared as described in Comparative Example 1, except that the barrier layer polymer was polyamide-co-imide Q of Table III. The barrier layer was prepared at 2.5 wt % in a 65/35 (wt/wt) mixture of ethanol and dichloromethane. A coating surfactant, SF1023, was added at a concentration of 0.003 wt % of the total solution. The barrier layer was coated at a dry coverage of 0.10 g/ft$^2$. The evaluation results are shown in Table VII.

TABLE VII

| Example | Barrier Polymer | $V_{toe}$ @ 20% RH Initial | $V_{toe}$ @ 20% RH 1000 cycles | Delta |
|---|---|---|---|---|
| Comp Example 4A | CM8000 Amilan | −22 V | −110 V | +88 V |
| Comp Example 5 | Polymer K | −153 V | −243 V | +90 V |
| Example 13 | Polymer Q | −41 V | −60 V | +19 V |

Black Spots Evaluation

As disclosed in Bugner et al, U.S. Pat. No. 5,681,677, incorporated herein by reference, in a Discharged Area Development (DAD) system, such as a high speed laser or LED printer, black spot formation can occur with certain photoconductive elements. The choice of barrier layer and barrier layer thickness is critical to minimize and eliminate the formation of black spots. The following examples which demonstrate the good performance of photoconductive elements of the invention, were coated using a 30 mm drum format compatible with the Hewlett Packard LaserJet 5Si commercial laser printer.

COMPARATIVE EXAMPLE 6

The methods and compositions of Comparative Example 3 were used to coat a 30 mm drum that is compatible with the HP LaserJet 5Si laser printer, except that no barrier layer was used. The CGL layer was coated over the bare aluminum substrate.

COMPARATIVE EXAMPLE 7

The same procedure and materials of Comparative Example 6 were used, except that Amilan CM8000 polymer was used as a barrier layer and coated at thickness of 0.1, 0.3, 0.8, and 1.7 microns.

EXAMPLE 14

A photoconductive element of the invention was prepared in a manner similar to Comparative Example 7, except that polyamide-co-imide L of Table III was used as the barrier layer. It was coated at thickness of 0.2, 0.8, and 1.2 microns.

EXAMPLE 15

A photoconductive element of the invention was prepared in a manner similar to Comparative Example 7, except that polyesterionomer-co-imide E-2 of Table II was used as the barrier layer. It was coated at thickness of 0.2, 0.8 and 1.2 microns.

To evaluate "black spot" formation susceptibility of these drums, the drum being evaluated replaced the original drum of an HP5Si cartridge. A "white page" was generated using the LaserJet 5Si laser printer for each drum sample. The generated white pages were scanned and analyzed for black spots. Correction was made for single toner background particles. The area analyzed was kept constant for all samples. The lower the "Black Spot Count", the better is the barrier layer. The results are shown in Table VIII. The effect of barrier thickness can be seen. Without any barrier the Black Spot Count is above 15,000. It is down to 241 for a 0.8-micron layer of Amilan CM8000. Examples 14 and 15 of this invention show good performance for similar thicknesses.

TABLE VIII

| Example | Barrier Polymer | Thickness Microns | Black Spot Count |
|---|---|---|---|
| Comp Example 6 | None | | 15,667 |
| Comp Example 7 | Amilan CM8000 | 0.1 | 5,587 |
| Comp Example 7 | Amilan CM8000 | 0.3 | 449 |
| Comp Example 7 | Amilan CM8000 | 0.8 | 241 |
| Comp Example 7 | Amilan CM8000 | 1.7 | 265 |
| Example 14 | Polymer L | 0.2 | 662 |
| Example 14 | Polymer L | 0.8 | 333 |
| Example 14 | Polymer L | 1.2 | 294 |
| Example 15 | Polymer E-2 | 0.8 | 580 |
| Example 15 | Polymer E-2 | 1.1 | 161 |
| Example 15 | Polymer E-2 | 1.6 | 130 |

Effect of CGL Coating Solvent

EXAMPLES 16 and 17

For the barrier layer to be effective, it is essential that it keep its integrity after the next coating (CGL) is applied. In other words the solvent of the CGL coating should not attack and dissolve the coated barrier layer. This is even more critical in the dip coating process, because of relatively long residence time in the coating solution. To show the importance of this effect Examples 12 and 13 were coated using polymer H and polymer E-1, respectively. These polyesterionomer-co-imides H and E-1 are slightly soluble and or swellable by chlorinated solvent such as dichloromethane (DCM) and 1,1,2-trichloroethane (TCE). However, they are completely immune to attack by tetrahydrofuran (THF). These two barrier polymers were employed with CGLs coated respectively with a DCM/TCE and a THF solution in a process similar to Comparative Example 3. The Black Spot Count comparison for the two conditions is shown in Table IX. The THF CGL versions performed substantially better than the DCM/TCE. This demonstrates the importance of protecting the barrier layer from damage by the solvent of the CGL.

TABLE IX

| Example | Barrier Polymer | Thickness Microns | Black Spot Count DCM CGL | Black Spot Count THF CGL |
|---|---|---|---|---|
| Example 16 | Polymer H | 0.7 | 1743 | 430 |
| Example 17 | Polymer E | 2.5 | 1205 | 374 |

The invention has been described with particular reference to preferred embodiments thereof, but it will be understood that variations and modifications can be effected by a person of ordinary skill in the art within the spirit and scope of the invention.

We claim:

1. A photoconductive element comprising an electrically conductive support, an electrical barrier layer and, solvent coated over said barrier layer, a charge generation layer capable of generating positive charges when exposed to actinic radiation, said barrier layer comprising a condensation polymer that transports charge primarily by electronic rather than ionic transport mechanisms, said polymer being a polyester-co-imide, polyesterionomer-co-imide or polyamide-co-imide and having as a repeating unit a planar, electron-deficient aromatic tetracarbonylbisimide group, said polymer having the formula:

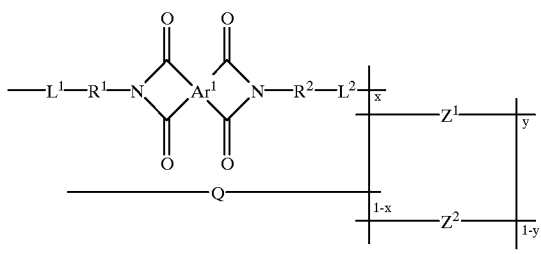

wherein Q represents one or more groups selected from (a) an alkylenedioxy, aromatic dicarboxyl, and aromatic diamino group having 2 to 36 carbon atoms;

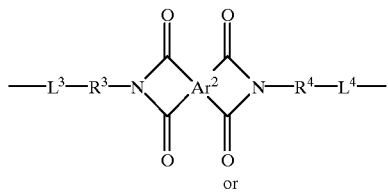

(b)

or (c)

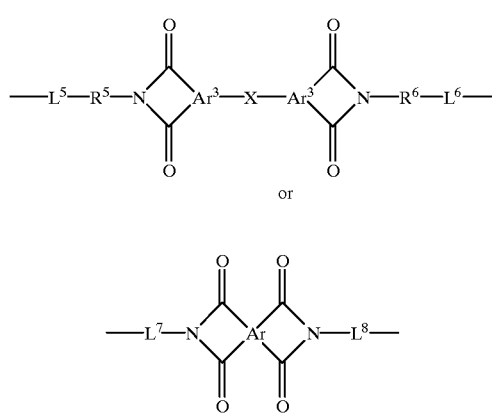

or (d)

and wherein $Ar^1$ and $Ar^2$ independently represent tetravalent aromatic groups having 6 to 20 carbon atoms, $Ar^3$ represents a trivalent aromatic group having 6 to 20 carbon atoms; $R^1$, $R^2$, $R^3$, $R^4$, $R^5$ and $R^6$ independently represent alkylene or alkyleneoxy groups having 2 to 12 carbon atoms; $L^1$, $L^2$, $L^3$, $L^4$, $L^5$ and $L^6$ independently represent O, C=O, $CO_2$ or NH; and $Z^1$ and $Z^2$ independently represent an aliphatic or aromatic dicarbonyl group having 2 to 36 carbon atoms; and X is O, $C(CF_3)_2$, S=O, $SO^2$; x and y represent mole fractions, x being the mole fraction of the group that contains $Ar^1$ and y being the mole fraction of $Z^1$, and x is 0.05 to 1 and y is 0 to 0.95.

2. A solvent-coated photoconductive element of claim 1 wherein said polymer is substantially insoluble in the solvent employed for coating said charge generation layer under the coating conditions employed.

3. A photoconductive element of claim 4 wherein said polymer is substantially insoluble in dichloromethane.

4. A photoconductive element of claim 4 wherein said polymer is substantially insoluble in ketones.

5. A photoconductive element of claim 4 wherein said polymer is substantially insoluble in tetrahydrofuran.

6. A photoconductive element of claim 4 wherein said polymer is a polyesterionomer-co-imide.

7. A photoconductive element of claim 4 wherein said polymer is a polyamide-co-imide.

8. A photoconductive element of claim 1 wherein said polymer is prepared from one or more of the diacids, dianhydrides and diesters selected from terephthalic acid, isophthalic acid, maleic acid, 2,6-napthanoic acid, 5-t-butylisophthalic acid, 1,4-cyclohexanedicarboxylic acid, 1,1,3-trimethyl-3-(4-carboxyphenyl)-5-indancarboxylic acid, dodecanedioic acid, 1-methylsuccinic acid, pyromellitic dianhydride, maleic anhydride, dimethyl succinate, dimethyl glutarate, dimethyl azelate, dimethyl adipate and dimethyl sebacate.

9. A photoconductive element of claim 1 wherein said polymer is prepared from an ionic monomer selected from dimethyl-5-sodiosulfoisophthalate, 5-(4-sodiosulfophenoxy)isophthalate acid, dimethyl-3-3'-iminobis(sodiosulfonylbenzoate), and dimethyl-5-(N-potassio-p-toluenesulfonamido)isophthalate.

10. A photoconductive element of claim 8 wherein the cation of said ionic monomer is selected from lithium, sodium, potassium, cesium, trimethylammonium, triethylammonium, diethylhydroxyethylammonium, dihydroxyethylethylammonium, triphenylmethylphosphonium and mixtures thereof.

11. A photoconductive element of claim 1 wherein said polymer is prepared one or more diols or equivalents selected from ethylene glycol, ethylene carbonate, 1,2-propanediol, 1-methyl-ethylene carbonate, 2,2'-oxydiethanol, 1,4-butanediol, 1,6-hexanediol, 1,10-decanediol, 1,4-cyclohexanedimethanol, 2,2-dimethyl-1,3-propanediol, 4,4-isopropylidenebisphenoxyethanol and tetraethylene glycol.

12. A photoconductive element of claim 1 wherein said bisimide groups are selected from 1,2,4,5-benzenetetracarboxylic bisimides; 1,4,5,8-naphthalenetetracarboxylic bisimides; 3,4,9,10-perylanetetracarboxylic bisimides; 2,3,6,7-anthraquinonetetracarboxylic bisimides and hexafluoroisopropylidene-2,2',3,3'-benzonetetracarbonyl bisimides.

13. A photoconductive element of claim 1 wherein said condensation polymer is poly [1,4,5,8-naphthalenetetracarbonyl-bisimide-2-ethoxyethylene-co-2,2-dimethyl-1,3-propylene (50/50) isophthalate].

14. A photoconductive element of claim 1 wherein said condensation polymer is poly [1,4,5,8-naphthalenetetracarbonyl-bisimide-2-ethoxyethylene-co-2,2-dimethyl-1,3-propylene-co-ethylene (25/25/50) terephthalate].

15. A photoconductive element of claim 1 wherein said condensation polymer is poly [1,4,5,8-naphthalentetracarbonyl-bisimide-5-pentamethylene-co-ethylene (50/50) terephthalate].

16. A photoconductive element of claim 1 wherein said condensation polymer is poly [2,2'-oxydiethylene-co-1,4,5,8-naphthalenetetracarbonyl-bisimide-5-pentamethylene (75/25) isophthalate-co-5-sodiosulfoisophthalate (80/20)].

17. A photoconductive element of claim 1 wherein said condensation polymer is poly [2,2'-oxydiethylene-co-1,4,5,8-naphthalenetetracarbonyl-bisimide-5-pentamethylene (75/25) isophthalate-co-5-sodiosulfoisophthalate (60/40)].

18. A photoconductive element of claim 1 wherein said condensation polymer is poly [2,2'-oxydiethylene-co-1,4,5,8-naphthalenetetracarbonyl-bisimide-5-pentamethylene (75/25) isophthalate-co-5-sodiosulfoisophthalate (50/50)].

19. A photoconductive element of claim 1 wherein said condensation polymer is poly [2,2'-oxydiethylene-co-1,4,5,8-naphthalonetetracarbonyl-bisimide-2-ethoxyethylene (80/20) isophthalate-co-5-sodiosulfoisophthalate (80/20)].

20. A photoconductive element of claim 1 wherein said condensation polymer is poly [1,4,5,8-naphthalenetetracarbonyl-bisimido-2-ethoxyethylene-co-2,2'-oxydiethylene (60/40) isophthalate-co-5-sodiosulfoisophthalate (80/20)].

21. A photoconductive element of claim 1 wherein said condensation polymer is poly [1,4,5,8-naphthalentetracarbonyl-bisimido-2-ethoxyethylene-co-2,2'-oxydiethylene (80/20) isophthalate-co-5-sodiosulfoisophthalate (80/20)].

22. A photoconductive element of claim 1 wherein said condensation polymer is poly [1,4,5,8-naphthalenetetracarbonyl-bisimido-2-ethoxyethylene-co-2,2'-oxydiethylene (40/60) isophthalate-co-5-sodiosulfoisophthalate (80/20)].

23. A photoconductive element of claim 1 wherein said condensation polymer is poly[dodecamethylene-co-piperazino (50/50)-1,1,3-trimethylphenylindane-co-dodecamethylene (50/50)]amide.

24. A photoconductive element of claim 1 wherein said condensation polymer is poly [1,3,3-trimethylcyclohexylmethylene-1,4,5,8-naphthylenetetracarbonyl-bis(imido-3-propylene)-co-dodecamethylene (20/80)]amide.

25. A photoconductive element of claim 1 wherein said condensation polymer is poly [dodecamethylene-co-1,4-piperazino (35/65)-1,4,5,8-naphthalenetetracarbonyl-bis(imido-3-propylene)-co-dodecamethylene (90/10)]amide.

26. A photoconductive element of claim 1 wherein said condensation polymer is poly [1,3,3-trimethylcyclohexane-1,5-methylene-1,4,5,8-naphthalenetetracarbonyl-bis(imido-11-undecamethylene)]amide.

27. A photoconductive element of claim 1 wherein said condensation polymer is poly [1,3,3-trimethylcyclohexane-1,5-methylene-dodecamethylene-co-1,4,5,8-naphthalene tetracarbonyl-bis(imido-11-undecamethylene) (90/10)] amide.

28. A photoconductive element of claim 1 wherein said condensation polymer is poly [1,3,3-trimethylcyclohexane-1,5-methylene-1,4,5,8-naphthalenetetracarbonyl-bis(imido-11-undecamethylene)-co-dodecamethylene (60/40)]amide.

29. A photoconductive element of claim 1 wherein said condensation polymer is poly [decamethylene-co-piperazino (70/30) decamethylene-co-1,1,3-trimethyl-3(4-phenylindanyl-co-1,4,5,8-naphthylenetetracarbony]-bisimidopropylene (50/30/20)]amide.

30. A photoconductive element of claim 1 wherein the barrier layer comprising said condensation polymer is on a conductive support which is an electroplated, seamless, flexible cylinder of nickel.

31. A photoconductive element of claim 1 wherein the barrier layer polymer comprises a blend of (a) said polymer that contains an aromatic tetracarboxylbisimide group with (b) an aliphatic copolyamide.

32. A photoconductive element of claim 1 wherein the thickness of said barrier layer is greater than one micron.

* * * * *